US012324781B1

(12) United States Patent
Xu et al.

(10) Patent No.: US 12,324,781 B1
(45) Date of Patent: Jun. 10, 2025

(54) VARIABLE STIFFNESS HAND EXOSKELETON DEVICE BASED ON ANTAGONISTIC DRIVING

(71) Applicant: SOUTHEAST UNIVERSITY, Jiangsu (CN)

(72) Inventors: Baoguo Xu, Jiangsu (CN); Qianqian Lu, Jiangsu (CN); Xin Wang, Jiangsu (CN); Weifeng Peng, Jiangsu (CN); Aiguo Song, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 19/060,754

(22) Filed: Feb. 23, 2025

Related U.S. Application Data

(63) Continuation of application No. PCT/CN2024/098321, filed on Jun. 11, 2024.

(30) Foreign Application Priority Data

May 27, 2024 (CN) ......................... 202410659867.1

(51) Int. Cl.
*A61H 1/02* (2006.01)

(52) U.S. Cl.
CPC ... *A61H 1/0288* (2013.01); *A61H 2201/0192* (2013.01); *A61H 2201/1215* (2013.01);
(Continued)

(58) Field of Classification Search
CPC .......... A61H 1/0288; A61H 2201/0192; A61H 2201/1215; A61H 2201/149;
(Continued)

(56) References Cited

U.S. PATENT DOCUMENTS

2011/0071664 A1* 3/2011 Linn ...................... B25J 9/0006 294/25
2013/0219585 A1* 8/2013 Bergelin ................ B25J 9/0006 2/160

(Continued)

FOREIGN PATENT DOCUMENTS

CN 110314066 10/2019
CN 111673781 9/2020

(Continued)

OTHER PUBLICATIONS

"International Search Report (Form PCT/ISA/210) of PCT/CN2024/098321," mailed on Jan. 12, 2025, pp. 1-4.

(Continued)

*Primary Examiner* — Timothy A Stanis
*Assistant Examiner* — Tyler A Raubenstraw
(74) *Attorney, Agent, or Firm* — JCIPRNET

(57) ABSTRACT

A variable stiffness hand exoskeleton device based on antagonistic driving, includes a power mechanism, a support base, a spring-link composite transmission mechanism, and a distal finger sleeve connected to a power output end of the spring-link composite transmission mechanism for fingers. The power mechanism drives the fingers to perform rotational movements through the spring-link composite transmission mechanism. The distal finger sleeve is fixed to a distal joint periphery of a finger joint using a first elastic adjustment band, and provides force feedback to an end of the finger joint under driving force of a link structure. An inner surface of the support base is contoured to match a palm, and a back of the support base is provided with a rotary support seat and a motor fixing seat. A motor group of the power mechanism is mounted on the motor fixing seat.

5 Claims, 2 Drawing Sheets

(52) U.S. Cl.
CPC .................. *A61H 2201/149* (2013.01); *A61H 2201/1638* (2013.01); *A61H 2201/165* (2013.01)

(58) Field of Classification Search
CPC ........ A61H 2201/14; A61H 2201/1638; A61H 2201/165; A61H 2201/1635; A61H 1/02; B25J 9/0006; A63B 21/00181; A63B 21/0058; A63B 21/023; A63B 21/0407; A63B 21/0442; A63B 21/4019; A63B 21/4021; A63B 23/14; A63B 23/16; A61F 2/583; A61F 2/586; A61F 2002/587; A61F 2002/6845; A61F 2002/6836; A61F 2002/5073
See application file for complete search history.

(56) References Cited

U.S. PATENT DOCUMENTS

| | | | | |
|---|---|---|---|---|
| 2016/0259417 | A1* | 9/2016 | Gu | G06F 3/014 |
| 2018/0303698 | A1* | 10/2018 | Wijesundara | F15B 15/10 |
| 2019/0336381 | A1* | 11/2019 | Koltzi | A61H 1/0285 |
| 2021/0220206 | A1* | 7/2021 | Wijesundara | F15B 15/08 |
| 2021/0333877 | A1* | 10/2021 | Song | G06F 3/016 |
| 2022/0079831 | A1* | 3/2022 | Ahmed | B25J 9/1633 |
| 2022/0133578 | A1* | 5/2022 | Song | A61H 1/0288 601/40 |
| 2023/0026300 | A1* | 1/2023 | Zhang | A61H 1/0288 |
| 2023/0139608 | A1* | 5/2023 | Song | A61H 1/0285 601/5 |
| 2024/0252379 | A1* | 8/2024 | Bhugra | A61F 2/588 |

FOREIGN PATENT DOCUMENTS

| | | | | |
|---|---|---|---|---|
| CN | 115570580 | | 1/2023 | |
| CN | 116372956 | | 7/2023 | |
| CN | 117064698 | | 11/2023 | |
| CN | 118650600 | | 9/2024 | |
| EP | 3278938 | A1 * | 2/2018 | B25J 9/0006 |
| GB | 2537900 | A * | 11/2016 | A61F 2/583 |
| KR | 20190107361 | | 9/2019 | |
| WO | WO-2015095459 | A1 * | 6/2015 | A61F 2/586 |

OTHER PUBLICATIONS

"Written Opinion of the International Searching Authority (Form PCT/ISA/237) of PCT/CN2024/098321," mailed on Jan. 12, 2025, pp. 1-4.

* cited by examiner

VARIABLE STIFFNESS HAND EXOSKELETON DEVICE BASED ON ANTAGONISTIC DRIVING

CROSS-REFERENCE TO RELATED APPLICATION

This is a continuation of International Application No. PCT/CN2024/098321, filed on Jun. 11, 2024, which claims the priority benefits of China Application No. 202410659867.1, filed on May 27, 2024. The entirety of each of the above-mentioned patent applications is hereby incorporated by reference herein and made a part of this specification.

BACKGROUND

Technical Field

The present disclosure belongs to the technical field of exoskeleton robots, and particularly relates to a variable stiffness hand exoskeleton device based on antagonistic driving.

Description of Related Art

In the context of aging global population, the ability of elderly individuals to live independently has attracted great social attention. With aging, many elderly individuals face problems of functional impairment or loss, which severely affects their daily activities such as eating, grooming, dressing, going to the toilet, and walking. As emerging technology, force-feedback exoskeletons provide a potential solution to the challenge. By simulating the working principles of human muscles and bones, force-feedback exoskeletons can help elderly individuals maintain physical activity, delay muscle strength decline, and improve their abilities to live independently.

Force-feedback exoskeletons not only have breakthroughs in functionality, but also provide a more immersive somatosensory interaction experience for the elderly individuals by combining with technologies such as virtual reality (VR) and augmented reality (AR). A wearer can interact with virtual environments through an exoskeleton, which not only improves entertainment experience but also provides a more effective means for rehabilitation training. However, traditional finger force-feedback exoskeleton devices have many limitations, such as discomfort in wearing, excessive weight, complex structures, and open-loop control, all of which hinder their effectiveness in practical applications.

SUMMARY

In order to solve the above problems, the present disclosure provides a variable stiffness hand exoskeleton device based on antagonistic driving. The device integrates the latest research achievements in bionics and robotics, especially in the control of joint stiffness, and adopts the application of nonlinear springs in an antagonistic configuration. By simulating the multi-axis rotation and changes in a force direction of human joints, the exoskeleton is capable of providing more natural and flexible movement support.

Different from traditional rigid exoskeletons, the device of the present disclosure is capable of adjusting the joint stiffness in real time through a closed-loop control system, so as to adapt to different movement needs. The real-time adjustment not only enhances comfort and usage efficiency of a wearer, but also provides precise haptics by adjusting the joint stiffness in real time, thereby reducing the system complexity and cost, and improving reliability and practicality.

In order to achieve the above objective, the present disclosure adopts the following technical solution:

A variable stiffness hand exoskeleton device based on antagonistic driving in the present disclosure includes a power mechanism, a support base, a spring-link composite transmission mechanism, and a distal finger sleeve connected to a power output end of the spring-link composite transmission mechanism; and the distal finger sleeve can be fixed to a distal joint periphery of a finger joint using a first elastic adjustment band, and the distal finger sleeve provides force feedback to an end of the finger joint under driving force of a link structure; an inner surface of the support base is contoured to match a complete/partial back of a palm, and a back of the support base is provided with a rotary support seat and a motor fixing seat; a motor group of the power mechanism is mounted on the motor fixing seat; and when the force feedback is provided, the spring-link composite transmission mechanism is located on an outer side of the palm.

Further, the power mechanism includes a first motor and a second motor that are arranged vertically; and the motor fixing seat is arranged in a position adjacent to a palm-level end of the support base, and the motor fixing seat includes first motor fixing seats and second motor fixing seats that are arranged vertically;

the spring-link composite transmission mechanism includes a first spring and a second spring, rotary bearings, rotary centers, a first spring-motor linkage cable, a second spring-motor linkage cable, a first spring-rotary pivot link, and a second spring-rotary pivot link;

a finger link structure is provided with the rotary centers, upper and lower ends of the rotary center are provided with two rotary sites, that is, rotary site A and rotary site B; a middle of the rotary member is hollowed out and is provided with a rotary site C; and the support base includes the rotary support seat and the motor fixing seat; a base of the first motor is fixed on the first motor fixing seats, and a base of the second motor is fixed on the second motor fixing seats; and the rotary site C of the spring-link composite transmission mechanism is rotationally connected to the rotary support seat of the support base via the rotary bearing.

Further, the first spring-motor linkage cable is rotationally connected to a power output end of the first motor, and the second spring-motor linkage cable is rotationally connected to a power output end of the second motor; two ends of the first spring are fixedly connected to the first spring-rotary pivot link and the first spring-motor linkage cable, and two ends of the second spring are fixedly connected to the second spring-rotary pivot link and the second spring-motor linkage cable; the first spring-rotary pivot link is rotationally connected to the rotary site A of the rotary center, and the second spring-rotary pivot link is rotationally connected to the rotary site B of the rotary center;

the distal finger sleeve includes an index-finger distal finger sleeve capable of being sleeved over a distal periphery of the index finger of the wearer, a middle-finger distal finger sleeve capable of being sleeved over a distal periphery of the middle finger of the wearer, a ring-finger distal finger sleeve capable of being sleeved over a distal periphery of the ring finger of the wearer, and a little-finger distal finger sleeve capable of being sleeved over a distal periphery of the little finger of the wearer;

the spring-link composite transmission mechanism includes a spring-link composite index finger transmission mechanism, a spring-link composite middle finger transmission mechanism, a spring-link composite ring finger transmission mechanism, and a spring-link composite little finger transmission mechanism capable of working independently;

a rotary center of the spring-link composite index finger transmission mechanism is rotationally connected to an index-finger distal finger sleeve, a rotary center of the spring-link composite middle finger transmission mechanism is rotationally connected to a middle-finger distal finger sleeve, a rotary center of the spring-link composite ring finger transmission mechanism is rotationally connected to a ring-finger distal finger sleeve, and a rotary center of the spring-link composite little finger transmission mechanism is rotationally connected to a little-finger distal finger sleeve;

the motor fixing seat includes a four-finger motor fixing seat, and the four-finger motor fixing seat is arranged in a position adjacent to a palm-level end of the support base;

the four-finger motor fixing seat includes an index-finger first motor fixing seat, an index-finger second motor fixing seat, a middle-finger first motor fixing seat, a middle-finger second motor fixing seat, a ring-finger first motor fixing seat, a ring-finger second motor fixing seat, a little-finger first motor fixing seat, and a little-finger second motor fixing seat;

the rotary support seat includes a four-finger rotary support seat, and four finger roots of the rotary support seat are flush with one another and can be flush with a cross section where a cross section where index finger root, middle finger root, ring finger root, and little finger root are located are located;

the four-finger rotary support seat includes an index-finger rotary support seat, a middle-finger rotary support seat, a ring-finger rotary support seat, and a little-finger rotary support seat; and a rotary center of the spring-link composite index finger transmission mechanism is mounted on the index-finger rotary support seat, a rotary center of the spring-link composite middle finger transmission mechanism is mounted on the middle-finger rotary support seat, a rotary center of the spring-link composite ring finger transmission mechanism is mounted on the ring-finger rotary support seat, and a rotary center of the spring-link composite little finger transmission mechanism is mounted on the little-finger rotary support seat.

Further, each of the spring-link composite index finger transmission mechanism, the spring-link composite middle finger transmission mechanism, the spring-link composite ring finger transmission mechanism, and the spring-link composite little finger transmission mechanism includes a spring group, a rotary bearing, a rotary center, a spring-motor linkage cable group, and a spring-rotary pivot link group;

the spring group includes the first spring and the second spring; the spring-motor linkage cable group includes a first spring-motor linkage cable and a second spring-motor linkage cable; the spring-rotary pivot link group includes a first spring-rotary pivot link and a second spring-rotary pivot link; upper and lower ends of the rotary center are provided with two rotary sites, that is, rotary site A and rotary site B; and a middle of the rotary member is hollowed out and is provided with a rotary site C;

the rotary site C of the spring-link composite transmission mechanism is rotationally connected to the rotary support seat of the support base via the rotary bearing; the first spring-motor linkage cable is rotationally connected to a power output end of the first motor, and the second spring-motor linkage cable is rotationally connected to a power output end of the second motor; two ends of the first spring are fixedly connected to the first spring-rotary pivot link and the first spring-motor linkage cable, and two ends of the second spring are fixedly connected to the second spring-rotary pivot link and the second spring-motor linkage cable; the first spring-rotary pivot link is rotationally connected to the rotary site A of the rotary center, and the second spring-rotary pivot link is rotationally connected to the rotary site B of the rotary center; the rotary center of the spring-link composite transmission mechanism is rotationally connected to the distal finger sleeve; and a center of the first motor is horizontally aligned with the rotary site A, and a center of the second motor is horizontally aligned with the rotary site B, so as to ensure that the power mechanism can smoothly and steadily drive the spring group.

Further, the support base is arranged in a U-shape, including the rotary support seat and the motor fixing seat; the support base is provided with an index-finger rotary support seat, a middle-finger rotary support seat, a ring-finger rotary support seat, and a little-finger rotary support seat in sequence near an end of the fingers; and the support base is provided with the index-finger first motor fixing seat, the index-finger second motor fixing seat, the middle-finger first motor fixing seat, the middle-finger second motor fixing seat, the ring-finger first motor fixing seat, the ring-finger second motor fixing seat, the little-finger first motor fixing seat, and the little-finger second motor fixing seat in sequence near an end of a wrist;

the rotary site C-1 of the rotary center A of the spring-link composite index finger transmission mechanism is rotationally connected to the index-finger rotary support seat of the support base via an index-finger rotary bearing, and a first motor a and a second motor b of an index finger power mechanism are fixed on the index-finger first motor fixing seat and the index-finger second motor fixing seat, respectively;

the rotary site C-2 of the rotary center B of the spring-link composite middle finger transmission mechanism is rotationally connected to the middle-finger rotary support seat of the support base via a middle-finger rotary bearing, and a first motor c and a second motor d of a middle finger power mechanism are fixed on the middle-finger first motor fixing seat and the middle-finger second motor fixing seat, respectively;

the rotary site C-3 of the rotary center C of the spring-link composite ring finger transmission mechanism is rotationally connected to the ring-finger rotary support seat of the support base via a ring-finger rotary bearing, and a first motor e and a second motor f of a ring finger power mechanism are fixed on the ring-finger first motor fixing seat and the ring-finger second motor fixing seat, respectively;

the rotary site C-4 of the rotary center D of the spring-link composite little finger transmission mechanism is rotationally connected to the little-finger rotary support seat of the support base via a little-finger rotary bearing, and a first motor g and a second motor h of a little finger power mechanism are fixed on the little-finger first motor fixing seat and the little-finger second motor fixing seat, respectively; and axes of the index-finger rotary support seat, the middle-finger rotary support seat, the ring-finger rotary support seat, and the little-finger rotary support seat are collinearly arranged, axes of the index-finger first motor fixing seat, the middle-finger first motor fixing seat, the ring-finger first motor fixing seat, and the little-finger first motor fixing seat are also collinearly arranged, and axes of the index-finger second motor fixing seat, the middle-finger second motor fixing seat, the ring-finger second motor fixing seat, and the little-finger second motor fixing seat are also collinearly arranged; and the axes of the first motor fixing seats are staggered with the axes of the second motor fixing seats.

Another technical objective of the present disclosure is to provide a use method for the variable stiffness hand exoskeleton device based on antagonistic driving, including: activating the index finger power mechanism to change a stiffness of the spring-link composite index finger transmission mechanism; activating the middle finger power mechanism to change a stiffness of the spring-link composite middle finger transmission mechanism;

activating the ring finger power mechanism to change a stiffness of the spring-link composite ring finger transmission mechanism; and activating the little finger power mechanism to change a stiffness of the spring-link composite little finger transmission mechanism;

where each of the spring-link composite index finger transmission mechanism, the spring-link composite middle finger transmission mechanism, the spring-link composite ring finger transmission mechanism, and the spring-link composite little finger transmission mechanism includes a spring group, a rotary bearing, a rotary center, a spring-motor linkage cable group, and a spring-rotary pivot link group; and the spring group includes the first spring and the second spring; the spring-motor linkage cable group includes a first spring-motor linkage cable group and a second spring-motor linkage cable group; the spring-rotary pivot link group includes a first spring-rotary pivot link group and a second spring-rotary pivot link group.

A working process of the spring-link composite index finger transmission mechanism, the spring-link composite middle finger transmission mechanism, the spring-link composite ring finger transmission mechanism, and the spring-link composite little finger transmission mechanism is as follows:

when the fingers are moving naturally, the second motor drives a reverse movement, the second spring is relaxed, the first motor is then activated, the first spring is tightened by power outputted from the first motor through the first spring-motor linkage cable which is rotationally connected to the power output end of the first motor, and the tightening of the first spring reduces the stiffness of the spring-link composite transmission mechanism, allows for natural movement of the figures; and when the fingers need to provide force feedback, the first motor drives a reverse movement, the first spring is relaxed, the second motor is activated, the second spring is tightened by power outputted from the second motor through the second spring-motor linkage cable which is rotationally connected to the power output end of the second motor, the tightening of the second spring increases the stiffness of the spring-link composite transmission mechanism, simulating the stiffness of an object and providing force feedback to fingertips of the fingers that wear the distal finger sleeves.

The present disclosure has the beneficial effects:

1. The support base and the spring-link composite transmission mechanism mounted on the support base are both located in an outer area of the palm, therefore, during movements, the hand exoskeleton device will not interfere with clenching or other hand movements of the user. The device allows the user's fingers to move up to 90 degrees near the metacarpophalangeal joint, with minimal interference to the natural movement space of the hand. In addition, the design ensures high portability of the device, enabling it to be used flexibly in different occasions without being restricted by a specific environment.

2. The spring-link composite transmission mechanism includes a spring-link composite index finger transmission mechanism, a spring-link composite middle finger transmission mechanism, a spring-link composite ring finger transmission mechanism, and a spring-link composite little finger transmission mechanism capable of working independently, that is, the index finger, middle finger, ring finger, and little finger of the present disclosure is respectively provided with the index finger precision force feedback mechanism, the middle finger precision force feedback mechanism, the ring finger precision force feedback mechanism, and the little finger precision force feedback mechanism, and the index finger precision force feedback mechanism, the middle finger precision force feedback mechanism, the ring finger precision force feedback mechanism, and the little finger precision force feedback mechanism are capable of working independently. Therefore, the four fingers of the device in the present disclosure can operate independently, and the active fingers can perform various actions, thereby having better force feedback effect.

3. The spring-link composite transmission mechanism of the present disclosure adopts two nonlinear springs, which simulates biceps and triceps muscles of a human arm, thereby simulating the ability of the antagonistic muscles in a biological system, so as to achieve the purpose of changing the stiffness of the spring-link composite transmission mechanism. This design not only provides the necessary power support for the fingers but also precisely adjusts the force outputted according to the user's hand movements, thereby achieving fine power feedback. The design of antagonistic driving allows the device to provide support while responding to the user's hand movements by dynamically adjusting stiffness, this self-adaptive stiffness adjustment greatly enhances flexibility and comfort during use. In addition, the antagonistic driving mechanism also helps simulate the biomechanical characteristics of natural hand movements, providing the user with more natural and fluid hand movement support without sacrificing the natural feel of the hand.

DESCRIPTION OF THE EMBODIMENTS

Figure 1:
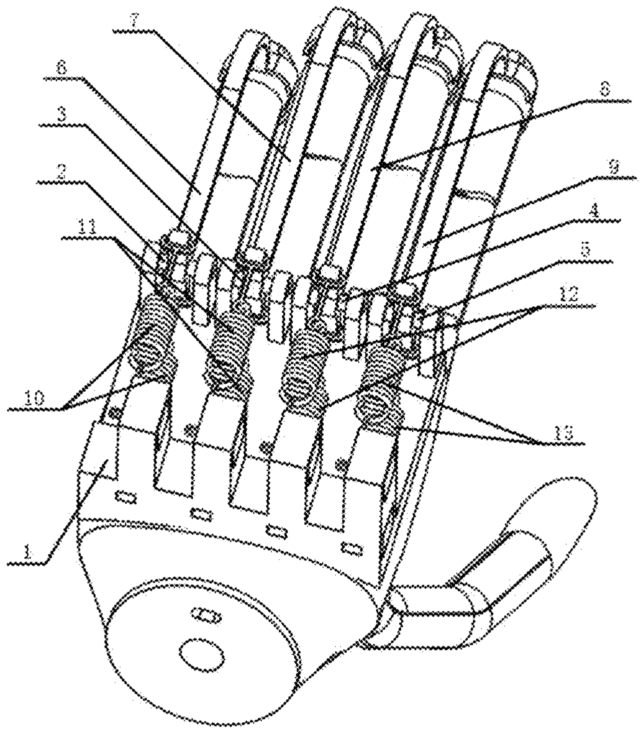
FIG. 1 is a structural schematic diagram of a variable stiffness hand exoskeleton device based on antagonistic driving according to the present disclosure that is mounted on a hand.

The present disclosure will be further illustrated below with reference to the accompanying drawings and specific embodiments. It should be understood that the following specific embodiments are only used to illustrate the present disclosure, but are not intended to limit the scope of the present disclosure.

As shown in the figures, a variable stiffness hand exoskeleton device based on antagonistic driving in the present disclosure includes a power mechanism, a support base 1, a spring-link composite transmission mechanism, and a distal finger sleeve connected to a power output end of the spring-link composite transmission mechanism.

The distal finger sleeve can be fixed to a distal joint periphery of a finger joint using an elastic adjustment band, and the distal finger sleeve provides force feedback to an end of the finger joint under driving force of a link structure; an inner surface of the support base 1 is contoured to match a complete/partial back of a palm, and a back of the support base is provided with a rotary support seat and a motor fixing seat; a motor group of the power mechanism is mounted on the motor fixing seat; and when the force feedback is provided, the spring-link composite transmission mechanism is located on an outer side of the palm.

In order to enable the variable stiffness hand exoskeleton device in the present disclosure to work independently for index finger, middle finger, ring finger, and little finger, the present disclosure specifically provides an index finger precision force feedback mechanism, a middle finger precision force feedback mechanism, a ring finger precision force feedback mechanism, and a little finger precision force feedback mechanism capable of working independently for the index finger, the middle finger, the ring finger, and the little finger (without involving a thumb).

The index finger precision force feedback mechanism includes a spring-link composite index finger transmission mechanism, an index finger power structure, and an index-finger distal finger sleeve 9-2 connected to a power output end of the index finger power structure; the middle finger precision force feedback mechanism includes a spring-link composite middle finger transmission mechanism, a middle finger power structure, and a middle-finger distal finger sleeve 8-2 connected to a power output end of the middle finger power structure; a ring finger precision force feedback mechanism includes the spring-link composite ring finger transmission mechanism, a ring finger power structure, and a ring-finger distal finger sleeve 7-2 connected to a power output end of the ring finger power structure; and a little finger precision force feedback mechanism includes a spring-link composite little finger transmission mechanism, a little finger power structure, and a little-finger distal finger sleeve 6-2 connected to a power output end of the little finger power structure.

It can be seen that the spring-link composite transmission mechanism in the present disclosure includes the spring-link composite index finger transmission mechanism, the spring-link composite middle finger transmission mechanism, the spring-link composite ring finger transmission mechanism, and the spring-link composite little finger transmission mechanism; the distal finger sleeve includes the index-finger distal finger sleeve 9-2 capable of being sleeved over a distal joint periphery of the index finger of the user, the middle-finger distal finger sleeve 8-2 capable of being sleeved over a distal joint periphery of the middle finger of the user, the ring-finger distal finger sleeve 7-2 capable of being sleeved over a distal joint periphery of the ring finger, and the little-finger distal finger sleeve 6-2 capable of being sleeved over a distal joint periphery of the little finger.

In order to achieve a setting mode that the spring-link composite transmission mechanism is located on the outer side of the palm, the spring-link composite transmission mechanism in the present disclosure adopts the following structural form.

Each of the spring-link composite index finger transmission mechanism, the spring-link composite middle finger transmission mechanism, the spring-link composite ring finger transmission mechanism, and the spring-link composite little finger transmission mechanism includes a spring group (little finger spring group 10/ring finger spring group 11/middle finger spring group 12/index finger spring group 13), a rotary bearing (little-finger rotary bearing 2/ring-finger rotary bearing 3/middle-finger rotary bearing 4/index-finger rotary bearing 5), a rotary center (index-finger rotary center 9-1/middle-finger rotary center 8-1/ring-finger rotary center 7-1/little-finger rotary center 6-1), a spring-motor linkage cable group (first spring-motor linkage cable 22/second spring-motor linkage cable 23), and a spring-rotary pivot link group (first spring-rotary pivot link 24/second spring-rotary pivot link 25); upper and lower ends of the rotary center are provided with two rotary sites, that is, rotary site A and rotary site B; a middle of the rotary member is hollowed out and is provided with a rotary site C; the rotary site C of the spring-link composite transmission mechanism is rotationally connected to the rotary support seat (little-finger rotary support seat 1-1/ring-finger rotary support seat 1-2/middle-finger rotary support seat 1-3/index-finger rotary support seat 1-4) of the support base via the rotary bearing (little-finger rotary bearing 2/ring-finger rotary bearing 3/middle-finger rotary bearing 4/index-finger rotary bearing 5); the first spring-motor linkage cable 22 is rotationally connected to a power output end of a first motor (the first motor includes first little finger motor 14/first ring finger motor 16/first middle finger motor 18/first index finger motor 20; taking the index finger as an example herein, the first spring-motor linkage cable 22 of the index finger is connected to the first index finger motor 20; and relevant components of the middle finger, the ring finger, and the little finger described in the present disclosure are connected in the same manner); the second spring-motor linkage cable 23 is rotationally connected to a power output end of a second motor (the second motor includes second little finger motor 15, second ring finger motor 17, second middle finger motor 19, second index finger motor 21; taking the index finger as an example herein, the second spring-motor linkage cable 23 of the index finger is connected to the second index finger motor 21; and relevant components of the middle finger, the ring finger, and the little finger described in the present disclosure are connected in the same manner); two ends of a first spring (first little finger spring 10-1/first ring finger spring 11-1/first middle finger spring 12-1/first index finger spring 13-1) are fixedly connected to the first spring-rotary pivot link 24 and the first spring-motor linkage cable 22 (taking the index finger as an example herein, two ends of the first index finger spring 13-1 of the index finger are fixedly connected to the first spring-rotary pivot link 24 of the index finger and the first spring-motor linkage cable 22 of the index finger, and relevant components of the middle finger, the ring finger, and the little finger described in the present disclosure are connected in the same manner), and two ends of a second spring (second little finger spring 10-2/second ring finger spring 11-2/second middle finger spring 12-2/second index finger spring 13-2) are fixedly connected to the second spring-rotary pivot link 25 and the second spring-motor linkage cable 23 (taking the index finger as an example herein, two ends of the second index finger spring 13-2 of the index finger are fixedly connected to the second spring-rotary pivot link 25 of the index finger and the second spring-motor linkage cable 23 of the index finger, and relevant components of the middle finger, the ring finger, and the little finger described in the present disclosure are connected in the same manner); the first spring-rotary pivot link is rotationally connected to the rotary site A of the rotary center, and the second spring-rotary pivot link is rotationally connected to the rotary site B of the rotary center (the rotary center includes little-finger rotary center 6-1/ring-finger rotary center 7-1/middle-finger rotary center 8-1/index-finger rotary center 9-1; and taking the index finger as an example herein, the first spring-rotary pivot link 24 of the index finger is rotationally connected to the rotary site A of the index-finger rotary center 9-1, and the second spring-rotary pivot link 25 of the index finger is rotationally connected to the rotary site B of the index-finger rotary center 9-1; and relevant components of the middle finger, the ring finger, and the little finger described in the present disclosure are connected in the same manner); the rotary center of the spring-link composite transmission mechanism is rotationally connected to the distal finger sleeve (the little-finger distal finger sleeve 6-2, the ring-finger distal finger sleeve 7-2, the middle-finger distal finger sleeve 8-2, and the index-finger distal finger sleeve 9-2); and a center of the first motor is horizontally aligned with the rotary site A, and a center of the second motor is horizontally aligned with the rotary site B, so as to ensure that the power mechanism can smoothly and steadily drive the spring group (including the little finger spring group 10, the ring finger spring group 11, the middle finger spring group 12, and the index finger spring group 13). It can be seen that the spring-link composite transmission mechanism and a specific installation on the support base 1 thereof can provide sufficient space for accommodating the palm when the fingers are moving. The arrangement of the spring-link composite transmission mechanism on the outer side of the palm ensures that the device in the present disclosure does not affect a gripping action of the user, allowing for a complete activity space for the user. Testing indicates that a range of movement for the MCP joint (proximal metacarpophalangeal joint) is 90 degrees, which almost meets the full range of all activity spaces.

The power mechanism includes the first motor (first little finger motor 14, first ring finger motor 16, first middle finger motor 18, and first index finger motor 20) and the second motor (second little finger motor 15, second ring finger motor 17, second middle finger motor 19, and second index finger motor 21), the first spring-motor linkage cable 22 is rotationally connected to a power output end of the first motor (first little finger motor 14, first ring finger motor 16, first middle finger motor 18, first index finger motor 20), and the second spring-motor linkage cable 23 is rotationally connected to a power output end of the second motor (second little finger motor 15, second ring finger motor 17, second middle finger motor 19, second index finger motor 21).

Axes of the index-finger rotary support seat 1-4, the middle-finger rotary support seat 1-3, the ring-finger rotary support seat 1-2, and the little-finger rotary support seat 1-1 are collinearly arranged, axes of an index-finger first motor fixing seat 1-11, a middle-finger first motor fixing seat 1-9, a ring-finger first motor fixing seat 1-7, and a little-finger first motor fixing seat 1-5 are also collinearly arranged, and axes of an index-finger second motor fixing seat 1-12, a middle-finger second motor fixing seat 1-10, a ring-finger second motor fixing seat 1-8, and a little-finger second motor fixing seat 1-6 are also collinearly arranged; and the axes of the first motor fixing seats are staggered with the axes of the second motor fixing seats; and In order to achieve an antagonistic driving design with variable stiffness, two nonlinear springs (the first little finger spring 10-1/first ring finger spring 11-1/first middle finger spring 12-1/first index finger spring 13-1/second little finger spring 10-2/second ring finger spring 11-2/second middle finger spring 12-2/second index finger spring 13-2) are adopted to simulate biceps and triceps muscles of a human arm, so as to simulate the ability of the antagonistic muscles in a biological system. When the fingers are moving naturally, the second motor (the second little finger motor 15/second ring finger motor 17/second middle finger motor 19/second index finger motor 21) drives a reverse movement, the second spring (the second little finger spring 10-2/second ring finger spring 11-2/second middle finger spring 12-2/second index finger spring 13-2) is relaxed, the first motor (the first little finger motor 14/first ring finger motor 16/first middle finger motor 18/first index finger motor 20) is then activated, the first spring is tightened by power outputted from the first motor through the first spring-motor linkage cable 22 which is rotationally connected to the power output end of the first motor (the first little finger spring 10-1/first ring finger spring 11-1/first middle finger spring 12-1/first index finger spring 13-1), and the tightening of the first spring reduces the stiffness of the spring-link composite transmission mechanism, allows for natural movement of the figures; and when the fingers need to provide force feedback, the first motor drives a reverse movement, the first spring is relaxed, the second motor is activated, the second spring is tightened by power outputted from the second motor through the second spring-motor linkage cable 23 which is rotationally connected to the power output end of the second motor, the tightening of the second spring increases the stiffness of the spring-link composite transmission mechanism, simulating the stiffness of an object and providing force feedback to fingertips of the fingers that wear the distal finger sleeves. This design not only provides the necessary power support for the fingers but also precisely adjusts the force outputted according to the user's hand movements, thereby achieving fine power feedback. The design of antagonistic driving allows the device to provide support while responding to the user's hand movements by dynamically adjusting stiffness, this self-adaptive stiffness adjustment greatly enhances flexibility and comfort during use. In addition, the antagonistic driving mechanism also helps simulate the biomechanical characteristics of natural hand movements, providing the user with more natural and fluid hand movement support without sacrificing the natural feel of the hand.

Figure 2:
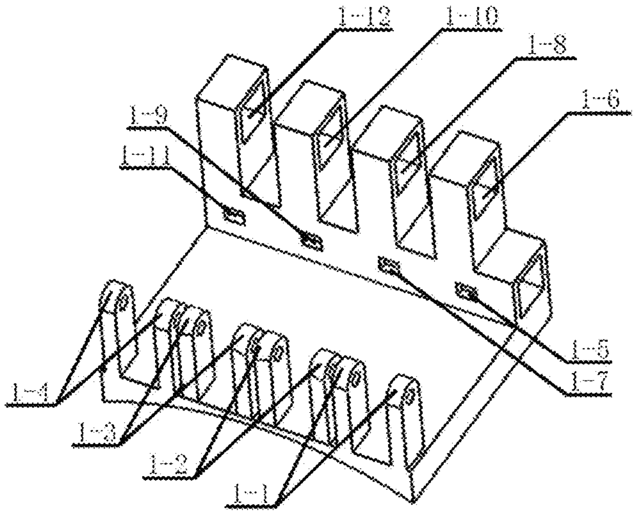
FIG. 2 is a structural schematic diagram of a support base according to the present disclosure.
Figure 3:
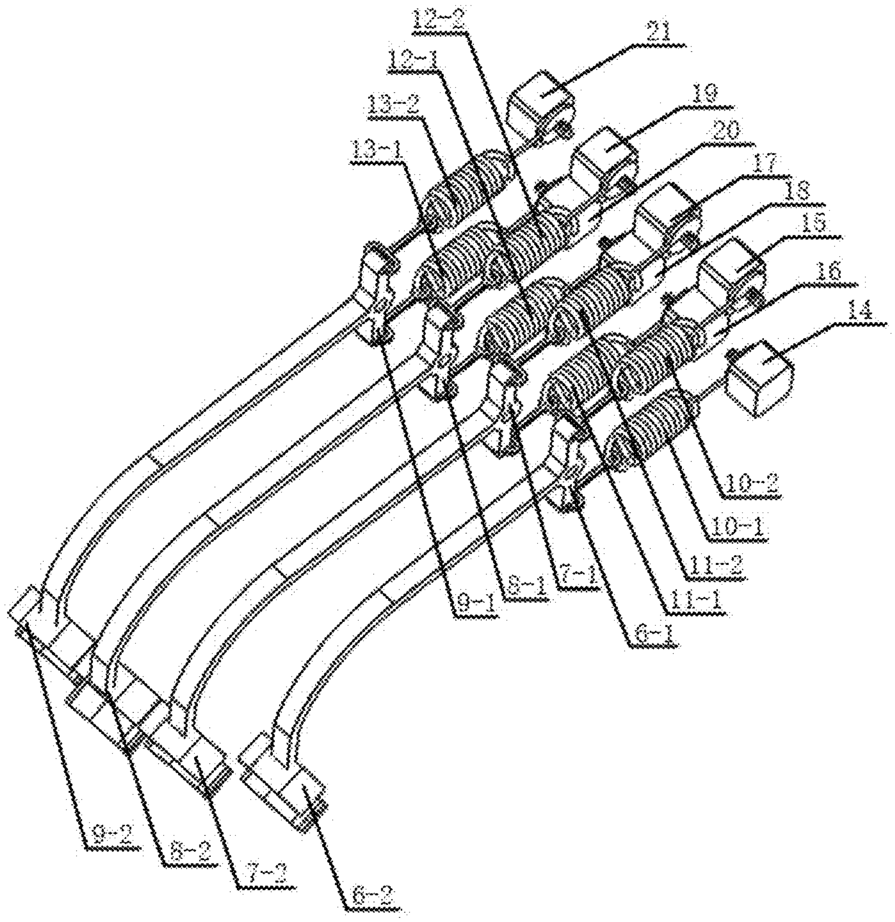
FIG. 3 is a structural schematic diagram of spring-link composite index finger transmission mechanism, spring-link composite middle finger transmission mechanism, spring-link composite ring finger transmission mechanism, and spring-link composite little finger transmission mechanism.
Figure 4:
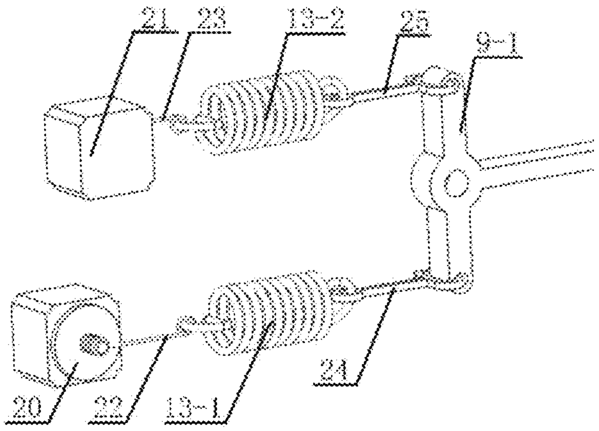
FIG. 4 is a schematic diagram of a detailed structure of a spring-link composite index finger transmission mechanism according to the present disclosure.

As shown in FIG. 2, an inner surface of the support base 1 is contoured to match a complete/partial back of a palm, and a back of the support base is provided with a rotary support seat and a motor fixing seat; a motor group of the power mechanism is mounted on the motor fixing seat; and when the device is worn, the spring-link composite transmission mechanism is located on an outer side of the palm.

Further, the support base 1 is arranged in a U-shape, including the rotary support seat and the motor fixing seat; the support base 1 is provided with the index-finger rotary support seat 1-4, the middle-finger rotary support seat 1-3, the ring-finger rotary support seat 1-2, and the little-finger rotary support seat 1-1 in sequence near an end of the fingers; and the support base 1 is provided with the index-finger first motor fixing seat 1-11, the index-finger second motor fixing seat 1-12, the middle-finger first motor fixing seat 1-9, the middle-finger second motor fixing seat 1-10, the ring-finger first motor fixing seat 1-7, the ring-finger second motor fixing seat 1-8, the little-finger first motor fixing seat 1-5, and the little-finger second motor fixing seat 1-6 in sequence near an end of a wrist.

A rotary site C-1 of the index-finger rotary center 9-1 of an index-finger link structure 9 is rotationally connected to the index-finger rotary support seat 1-4 of the support base 1 via an index-finger rotary bearing 5; the first index finger motor 20 and the second index finger motor 21 of an index finger power mechanism are fixed on the index-finger first motor fixing seat 1-11 and the index-finger second motor fixing seat 1-12, respectively; a rotary site C-2 of the middle-finger rotary center 8-1 of the middle-finger link structure 8 is rotationally connected to the middle-finger rotary support seat 1-3 of the support base 1 via a middle-finger rotary bearing 4; the first middle finger motor 18 and the second middle finger motor 19 of a middle finger power mechanism are fixed on the middle-finger first motor fixing seat 1-9 and the middle-finger second motor fixing seat 1-10, respectively; a rotary site C-3 of the ring-finger first motor fixing seat 7-1 of a ring-finger link structure 7 is rotationally connected to the ring-finger rotary support seat 1-2 of the support base 1 via a ring-finger rotary bearing 3; the first ring finger motor 16 and the second ring finger motor 17 of a ring finger power mechanism are fixed on the ring-finger first motor fixing seat 1-7 and the ring-finger second motor fixing seat 1-8, respectively; a rotary site C-4 of the little-finger first motor fixing seat 6-1 of a little-finger link structure 6 is rotationally connected to the little-finger rotary support seat 1-1 of the support base 1 via a little-finger rotary bearing 2; and the first little finger motor 14 and the second little finger motor 15 of a little finger power mechanism are fixed on the little-finger first motor fixing seat 1-5 and the little-finger second motor fixing seat 1-6, respectively.

Based on the aforementioned variable stiffness hand exoskeleton device based on antagonistic driving, it can be known that the working principles of the present disclosure are as follows.

When force feedback is needed for the fingertip of the index finger, the spring-link composite index finger transmission mechanism is activated to drive the distal finger sleeve of the index finger, thereby achieving force feedback at the end of the index finger.

When force feedback is needed for the fingertip of the middle finger, the spring-link composite middle finger transmission mechanism is activated to drive the distal finger sleeve of the middle finger, thereby achieving force feedback at the end of the middle finger.

When force feedback is needed for the fingertip of the ring finger, the spring-link composite ring finger transmission mechanism is activated to drive the distal finger sleeve of the ring finger, thereby achieving force feedback at the end of the ring finger.

When force feedback is needed for the fingertip of the little finger, the spring-link composite little finger transmission mechanism is activated to drive the distal finger sleeve of the little finger, thereby achieving force feedback at the end of the little finger.

The spring-link composite little finger transmission mechanisms achieve force feedback at the fingertips by actuating the distal finger sleeves, with specific steps as follows.

When the fingers are moving naturally, the second motor (the second little finger motor 15/second ring finger motor 17/second middle finger motor 19/second index finger motor 21) drives a reverse movement, the second spring (the second little finger spring 10-2/second ring finger spring 11-2/second middle finger spring 12-2/second index finger spring 13-2) is relaxed, the first motor (the first little finger motor 14/first ring finger motor 16/first middle finger motor 18/first index finger motor 20) is then activated, the first spring is tightened by power outputted from the first motor through the first spring-motor linkage cable 22 which is rotationally connected to the power output end of the first motor (the first little finger spring 10-1/first ring finger spring 11-1/first middle finger spring 12-1/first index finger spring 13-1), and the tightening of the first spring reduces the stiffness of the spring-link composite transmission mechanism, allows for natural movement of the figures.

When the fingers need to provide force feedback, the first motor drives a reverse movement, the first spring is relaxed, the second motor is activated, the second spring is tightened by power outputted from the second motor through the second spring-motor linkage cable 23 which is rotationally connected to the power output end of the second motor, the tightening of the second spring increases the stiffness of the spring-link composite transmission mechanism, simulating the stiffness of an object and providing force feedback to fingertips of the fingers that wear the distal finger sleeves.

It should be noted that the above content merely illustrates the technical idea of the present disclosure and cannot limit the protection scope of the present disclosure, those ordinarily skilled in the art may also make some modifications and improvements without departing from the principle of the present disclosure, and these modifications and improvements should also fall within the protection scope of the claims of the present disclosure.

What is claimed is:

1. A variable stiffness hand exoskeleton device based on antagonistic driving, comprising a power mechanism, a support base, a spring-link composite transmission mechanism, and a distal finger sleeve connected to a power output end of the spring-link composite transmission mechanism for index finger, middle finger, ring finger, and little finger; and the power mechanism implements force feedback through the spring-link composite transmission mechanism; wherein the distal finger sleeve is fixed to a distal joint periphery of a finger joint using a first elastic adjustment band, and the distal finger sleeve provides force feedback to an end of the finger joint under driving force of a link structure; an inner surface of the support base is contoured to match a complete/partial back of a palm, and a back of the support base is provided with a rotary support seat and a motor fixing seat; a motor group of the power mechanism is mounted on the motor fixing seat; and when the force feedback is provided, the spring-link composite transmission mechanism is located on an outer side of the palm;

the power mechanism comprises a first motor and a second motor that are arranged vertically; and the motor fixing seat is arranged in a position adjacent to a palm-level end of the support base, and the motor fixing seat comprises first motor fixing seats and second motor fixing seats that are arranged vertically;

the support base comprises the rotary support seat and the motor fixing seat;

the spring-link composite transmission mechanism comprises a first spring and a second spring, rotary bearings, rotary centers, a first spring-motor linkage cable, a second spring-motor linkage cable, a first spring-rotary pivot link, and a second spring-rotary pivot link;

a finger link structure is provided with the rotary centers, upper and lower ends of the rotary center are provided with two rotary sites, that is, a first rotary site and a second rotary site; a middle of the rotary member is hollowed out and is provided with a third rotary site; and a base of the first motor is fixed on the first motor fixing seats, and a base of the second motor is fixed on the second motor fixing seats; and the third rotary site of the spring-link composite transmission mechanism is rotationally connected to the rotary support seat of the support base via the rotary bearing.

2. The variable stiffness hand exoskeleton device based on antagonistic driving according to claim 1, wherein the first spring-motor linkage cable is rotationally connected to a power output end of the first motor, and the second spring-motor linkage cable is rotationally connected to a power output end of the second motor; two ends of the first spring are fixedly connected to the first spring-rotary pivot link and the first spring-motor linkage cable, and two ends of the second spring are fixedly connected to the second spring-rotary pivot link and the second spring-motor linkage cable; the first spring-rotary pivot link is rotationally connected to the first rotary site of the rotary center, the second spring-rotary pivot link is rotationally connected to the second rotary site of the rotary center, and the rotary center of the spring-link composite transmission mechanism is rotationally connected to the distal finger sleeve; and a center of the first motor is horizontally aligned with the first rotary site, and a center of the second motor is horizontally aligned with the second rotary site.

3. The variable stiffness hand exoskeleton device based on antagonistic driving according to claim 1, wherein the spring-link composite transmission mechanism comprises a spring-link composite index finger transmission mechanism, a spring-link composite middle finger transmission mechanism, a spring-link composite ring finger transmission mechanism, and a spring-link composite little finger transmission mechanism capable of working independently;

a rotary center of the spring-link composite index finger transmission mechanism is rotationally connected to an index-finger distal finger sleeve, a rotary center of the spring-link composite middle finger transmission mechanism is rotationally connected to a middle-finger distal finger sleeve, a rotary center of the spring-link composite ring finger transmission mechanism is rotationally connected to a ring-finger distal finger sleeve, and a rotary center of the spring-link composite little finger transmission mechanism is rotationally connected to a little-finger distal finger sleeve;

the motor fixing seat comprises a four-finger motor fixing seat, and the four-finger motor fixing seat is arranged in a position adjacent to a palm-level end of the support base;

the four-finger motor fixing seat comprises an index-finger first motor fixing seat, an index-finger second motor fixing seat, a middle-finger first motor fixing seat, a middle-finger second motor fixing seat, a ring-finger first motor fixing seat, a ring-finger second motor fixing seat, a little-finger first motor fixing seat, and a little-finger second motor fixing seat; and the rotary support seat comprises a four-finger rotary support seat, and four finger roots of the rotary support seat are flush with one another and is able be flush with a cross section where a cross section where index finger root, middle finger root, ring finger root, and little finger root are located are located.

4. The variable stiffness hand exoskeleton device based on antagonistic driving according to claim 1, wherein the support base is arranged in a U-shape, comprising the rotary support seat and the motor fixing seat; the support base is provided with an index-finger rotary support seat, a middle-finger rotary support seat, a ring-finger rotary support seat, and a little-finger rotary support seat in sequence near an end of the fingers; and the support base is provided with the index-finger first motor fixing seat, the index-finger second motor fixing seat, the middle-finger first motor fixing seat, the middle-finger second motor fixing seat, the ring-finger first motor fixing seat, the ring-finger second motor fixing seat, the little-finger first motor fixing seat, and the little-finger second motor fixing seat in sequence near an end of a wrist;

a rotary site of a first rotary center of the spring-link composite index finger transmission mechanism is rotationally connected to the index-finger rotary support seat of the support base via an index-finger rotary bearing, and a first motor and a second motor of an index finger power mechanism are fixed on the index-finger first motor fixing seat and the index-finger second motor fixing seat, respectively;

a rotary site of a second rotary center of the spring-link composite middle finger transmission mechanism is rotationally connected to the middle-finger rotary support seat of the support base via a middle-finger rotary bearing, and a first motor and a second motor of a middle finger power mechanism are fixed on the middle-finger first motor fixing seat and the middle-finger second motor fixing seat, respectively;

a rotary site of a third rotary center of the spring-link composite ring finger transmission mechanism is rotationally connected to the ring-finger rotary support seat of the support base via a ring-finger rotary bearing, and a first motor and a second motor of a ring finger power mechanism are fixed on the ring-finger first motor fixing seat and the ring-finger second motor fixing seat, respectively;

a rotary site of a fourth rotary center of the spring-link composite little finger transmission mechanism is rotationally connected to the little-finger rotary support seat of the support base via a little-finger rotary bearing, and a first motor and a second motor of a little finger power mechanism are fixed on the little-finger first motor fixing seat and the little-finger second motor fixing seat, respectively; and axes of the index-finger rotary support seat, the middle-finger rotary support seat, the ring-finger rotary support seat, and the little-finger rotary support seat are collinearly arranged, axes of the index-finger first motor fixing seat, the middle-finger first motor fixing seat, the ring-finger first motor fixing seat, and the little-finger first motor fixing seat are also collinearly arranged, and axes of the index-finger second motor fixing seat, the middle-finger second motor fixing seat, the ring-finger second motor fixing seat, and the little-finger second motor fixing seat are also collinearly arranged; and the axes of the first motor fixing seats are staggered with the axes of the second motor fixing seats.

5. A use method for the variable stiffness hand exoskeleton device based on antagonistic driving according to claim 1, comprising:

activating the index finger power mechanism to change a stiffness of the spring-link composite index finger transmission mechanism; activating the middle finger power mechanism to change a stiffness of the spring-link composite middle finger transmission mechanism;

activating the ring finger power mechanism to change a stiffness of the spring-link composite ring finger transmission mechanism; and activating the little finger power mechanism to change a stiffness of the spring-link composite little finger transmission mechanism;

wherein, when the fingers are moving naturally, the second motor drives a reverse movement, the second spring is relaxed, the first motor is then activated, the first spring is tightened by power outputted from the first motor through the first spring-motor linkage cable which is rotationally connected to the power output end of the first motor, and the tightening of the first spring reduces the stiffness of the spring-link composite transmission mechanism, allows for natural movement of the figures; and when the fingers need to provide force feedback, the first motor drives a reverse movement, the first spring is relaxed, the second motor is activated, the second spring is tightened by power outputted from the second motor through the second spring-motor linkage cable which is rotationally connected to the power output end of the second motor, the tightening of the second spring increases the stiffness of the spring-link composite transmission mechanism, simulating the stiffness of an object and providing force feedback to fingertips of the fingers that wear the distal finger sleeves.

* * * * *